(12) United States Patent
Bresniker et al.

(10) Patent No.: US 9,425,902 B2
(45) Date of Patent: Aug. 23, 2016

(54) SYSTEM INCLUDING DRIVER CIRCUIT FOR ELECTRICAL SIGNALING AND OPTICAL SIGNALING

(75) Inventors: Kirk M. Bresniker, Granite Bay, CA (US); Greg Astfalk, Parker, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 288 days.

(21) Appl. No.: 13/386,632

(22) PCT Filed: Jan. 11, 2010

(86) PCT No.: PCT/US2010/020665
§ 371 (c)(1),
(2), (4) Date: Jan. 23, 2012

(87) PCT Pub. No.: WO2011/084163
PCT Pub. Date: Jul. 14, 2011

(65) Prior Publication Data
US 2012/0119795 A1    May 17, 2012

(51) Int. Cl.
*H03K 3/00* (2006.01)
*H04B 10/80* (2013.01)

(52) U.S. Cl.
CPC .................................. *H04B 10/801* (2013.01)

(58) Field of Classification Search
USPC ......................................................... 327/108
See application file for complete search history.

(56) References Cited

U.S. PATENT DOCUMENTS

| | | | |
|---|---|---|---|
| 5,319,258 A * | 6/1994 | Ruetz | H03K 19/00361 326/21 |
| 7,256,624 B2 * | 8/2007 | Cheng et al. | 327/112 |
| 7,439,761 B2 * | 10/2008 | Mayer et al. | 326/30 |
| 7,576,573 B2 | 8/2009 | Nguyen | |
| 7,605,651 B2 | 10/2009 | Ripley et al. | |
| 7,763,812 B2 * | 7/2010 | Fukuda | 174/538 |
| 7,906,986 B2 * | 3/2011 | Lee | 326/30 |
| 8,352,793 B2 * | 1/2013 | Lee | 714/30 |
| 9,299,423 B2 | 3/2016 | Baker et al. | |
| 2002/0116652 A1 | 8/2002 | Chen | |
| 2002/0162038 A1 | 10/2002 | Bullman et al. | |
| 2003/0043426 A1 * | 3/2003 | Baker et al. | 359/109 |
| 2004/0126115 A1 | 7/2004 | Levy et al. | |
| 2004/0264837 A1 | 12/2004 | Ogawa et al. | |

(Continued)

FOREIGN PATENT DOCUMENTS

CN      1578948 A        2/2005
WO      WO-2008126755 A1  10/2008

OTHER PUBLICATIONS

International Searching Authority, International Search Report and the Written Opinion, Sep. 16, 2010, 9 pages.

(Continued)

*Primary Examiner* — Lincoln Donovan
*Assistant Examiner* — Patrick Chen
(74) *Attorney, Agent, or Firm* — Dicke, Billig & Czaja, PLLC

(57) ABSTRACT

A system including a driver circuit. The driver circuit is configured to provide first output signals in a first mode for electrical signaling and second output signals in a second mode for optical signaling. The driver circuit is configured to provide the first output signals in the first mode with at least one of a lower frequency and higher power and the second output signals in the second mode with at least one of a higher frequency and lower power.

17 Claims, 6 Drawing Sheets

(56) References Cited

U.S. PATENT DOCUMENTS

| | | |
|---|---|---|
| 2007/0142098 A1 | 6/2007 | Behzad et al. |
| 2007/0234080 A1 | 10/2007 | Mackey et al. |
| 2008/0181081 A1* | 7/2008 | Mayer et al. ............... 369/100 |
| 2009/0169219 A1* | 7/2009 | Nakano et al. ............. 398/200 |
| 2009/0262791 A1 | 10/2009 | Matalon et al. |

OTHER PUBLICATIONS

The International Bureau of WIPO, International Preliminary Report for PCT/US2010/020665 dated Jul. 26, 2012 (6 pages).

* cited by examiner

SYSTEM INCLUDING DRIVER CIRCUIT FOR ELECTRICAL SIGNALING AND OPTICAL SIGNALING

CROSS-REFERENCE TO RELATED APPLICATION

This application is a national stage application under 35 U.S.C. §371 of PCT/US2010/020665, filed Jan. 11, 2010.

BACKGROUND

Data communications can limit the delivered performance of a system, such as a server. Typically, a processor, such as a micro-processor, communicates with other system components via electrical signals that exit the processor via pins on the processor package and/or socket. These pins are metal contacts that mate to metal contacts on the printed circuit board. Conductive paths on the printed circuit board, referred to as traces, route the signals from the mating metal contacts to other components or connectors on the printed circuit board. Connectors route the signals to other printed circuit boards and/or other system racks. Data communicated via these communication paths includes any bit transmitted over any distance, such as user data, application data, memory coherency traffic, and control signals.

Each communication path includes a pin and a driver circuit on the originating device. Each pin and driver circuit is part of an interconnect scheme, where the driver circuit is built to provide a signal that can be reliably received at a receiver. Typically, the interconnect scheme specifies the maximum trace length and the maximum number of connectors. For example, the interconnect scheme may specify a maximum trace length of 20 inches and a maximum number of connectors of 3 connectors.

The interconnect schemes have two limiting aspects, which are built into the driver circuit. First, the signaling rate or frequency is limited by signal integrity issues, where longer traces and more connectors reduce signal integrity. Second, more power is required to drive higher frequency signals over longer traces and through more connectors.

Often, at least some, if not most, of the power used by a driver circuit is lost and not received at the receiver. Instead, the power is lost in dissipated heat or lost in transit, due to such effects as resistive loss, reflection from impedance mismatches, and capacitive/inductive losses. Also, if the trace length is less than the maximum trace length and/or the number of connectors is less than the maximum number of connectors, the driver circuit wastes power by consuming excess power and providing excess power to the pin.

For these and other reasons there is a need for the present invention.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is hot to be taken in a limiting sense, and the scope of the present invention is defined by the appended claims.

Figure 1:
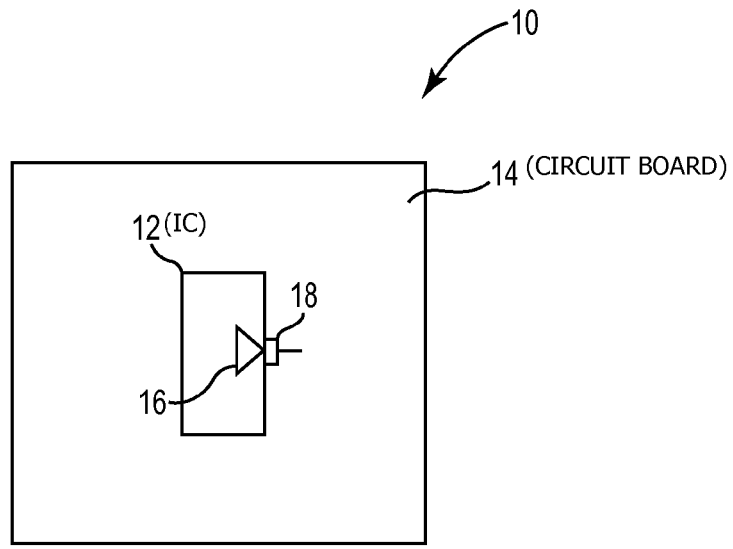
FIG. 1 is a diagram illustrating one embodiment of a system that includes an integrated circuit that includes a driver circuit.

FIG. 1 is a diagram illustrating one embodiment of a system 10 that includes an integrated circuit (IC) 12 coupled to a circuit board 14. Integrated circuit 12 includes a driver circuit 16 that is electrically coupled to an output pin 18. Driver circuit 16 is configured to provide output signals through output pin 18, where driver circuit 16 is configured to provide output signals for which electrical signaling is preferred and output signals for which optical signaling is preferred. In one embodiment, system 10 is a server. In one embodiment, integrated circuit 12 is a processor, such as a micro-processor.

Driver circuit 16 is tunable or configurable for electrical signaling and tunable or configurable for optical signaling. Also, driver circuit 16 is electrically coupled to output pin 18, which can be electrically coupled to ah electrical trace for electrical signaling and electrically coupled to ah electrical-to-optical converter for optical signaling.

Driver circuit 16 is configured to provide first output signals in a first mode for electrical signaling and second output signals in a second mode for optical signaling. Driver circuit 16 is configured to provide the first output signals in the first mode at a lower frequency and/or higher power due to the limitations of electrical signaling and the second output signals in the second mode at a higher frequency and/or lower power due to the lack of dissipative effects in optical transmission. In other embodiments, integrated circuit 12 includes any suitable number of driver circuits, such as driver circuit 16.

Figure 2:
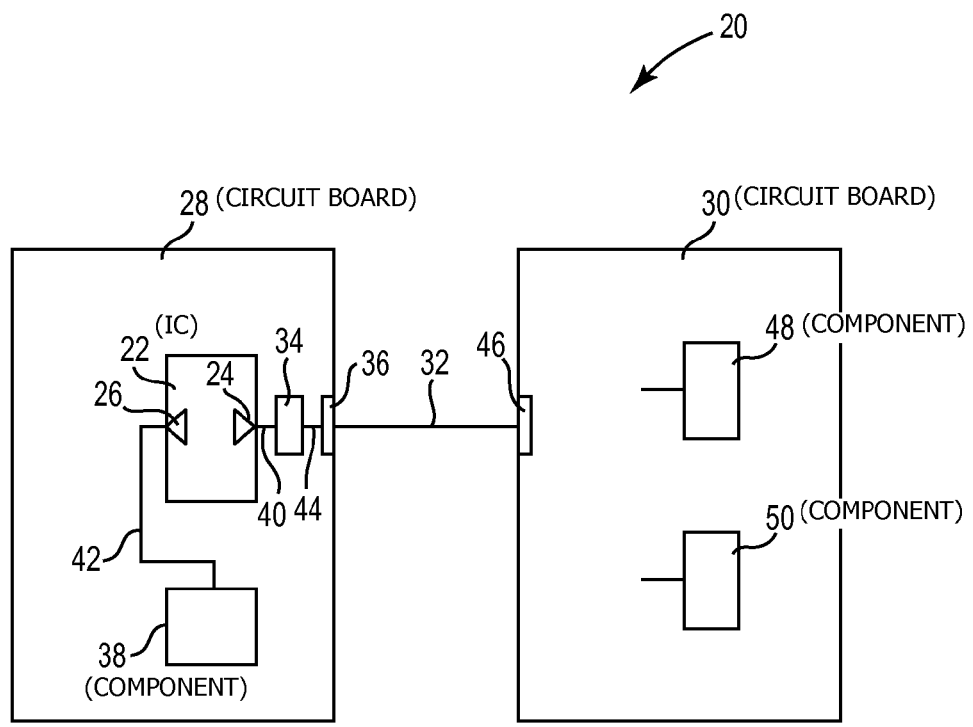
FIG. 2 is a diagram illustrating one embodiment of a system that includes an integrated circuit that includes two driver circuits, a first driver circuit and a second driver circuit.

FIG. 2 is a diagram illustrating one embodiment of a system 20 that includes an integrated circuit (IC) 22 that includes two driver circuits, a first driver circuit 24 and a second driver circuit 26. Each of the driver circuits 24 and 26 is configured to provide first output signals for which electrical signaling is preferred and second output signals for which optical signaling is preferred due to increased frequency and/or reduced power. Also, each of the driver circuits 24 and 26 is similar to driver circuit 16 (shown in FIG. 1). In one embodiment, system 20 is a server. In one embodiment, integrated circuit 22 is a processor, such as a micro-processor.

Integrated circuit 22 includes a first driver circuit 24 and a second driver circuit 26. Each of the driver circuits 24 and 26 is configured to provide first output signals in a first mode for electrical signaling and second output signals in a second mode for optical signaling. Also, each of the driver circuits 24 and 26 is configured to provide the first output signals in the first mode at a lower frequency and/or higher power due to the limitations of electrical signaling and the second output signals in the second mode at a higher frequency and/or lower power due to the lack of dissipative effects in optical transmission. First driver circuit 24 is electrically coupled to a first pin (not shown) and second driver circuit 26 is electrically coupled to a second pin (not shown). In other embodiments, integrated circuit 22 includes any suitable number of driver circuits similar to driver circuits 24 and 26.

System 20 includes a first circuit board 28 and a second circuit board 30. First circuit board 28 is optically coupled to second circuit board 30 via optical transmission path 32. As described herein, an optical transmission path, such as optical transmission path 32 and any other optical transmission path identified herein, can be one or more optical transmission mediums, alone or in combination. In one embodiment, one or more optical transmission paths include an optical transmission line. In one embodiment, one or more optical transmission paths include an optical fiber. In one embodiment, one or more optical transmission paths include free-space. In one embodiment, one or more optical transmission paths include a waveguide.

First circuit board 28 includes integrated circuit 22, an electrical-to-optical converter 34, an optical connector 36, and a component 38. First driver circuit 24 is electrically coupled to electrical-to-optical converter 34 via the first pin and a first trace 40. Electrical-to-optical converter 34 is optically coupled to optical connector 36 via optical transmission path 44. Second driver circuit 26 is electrically coupled to component 38 via the second pin and a second trace 42. In one embodiment, first trace 40 is less than second trace 42. In one embodiment, first trace 40 is less than 2 inches. In one embodiment, second trace 42 is up to 20 inches long.

Second circuit board 30 includes optical connector 46 and components 48 and 50. Optical connector 36 on first circuit board 28 is optically coupled to optical connector 46 on second circuit board 30 via optical transmission path 32. Second circuit board 30 includes a circuit (not shown for clarity) that converts the optical signals from optical connector 46 to electrical signals that are received at components 46 and 48. In one embodiment, optical transmission path 32 is substantially longer than 20 inches.

In operation, first driver circuit 24 is activated or put into the second mode to transmit second output signals for optical signaling. First driver circuit 24 transmits electrical signals to electrical-to-optical converter 34 via first trace 40. These second output signals can be at a higher frequency and/or lower power than the first output signals. Electrical-to-optical converter 34 converts the second output signals to optical signals and transmits the optical signals to optical connector 36 via optical transmission path 44. Optical connector 36 transmits the received optical signals to optical connector 46 on second circuit board 30 via optical transmission path 32, which can be substantially longer than 20 inches. The second circuit board 30 converts the optical signals from optical connector 46 to electrical signals that are received at components 46 and 48.

Second driver circuit 26 is activated or put into the first mode to transmit first output signals for electrical signaling. Second driver circuit 26 transmits electrical signals to component 38 via second trace 40. These first output signals are at a lower frequency and/or higher power than the second output signals.

In one embodiment, integrated circuit 22 includes error correction circuitry or an error correction algorithm. If a driver circuit, such as driver circuit 24 or driver circuit 26, is put into the first mode, integrated circuit 22 provides data to the driver circuit in the first mode with error correction. However, if a driver circuit, such as driver circuit 24 or driver circuit 26, is put into the second mode, integrated circuit 22 turns off error correction and provides data to the driver circuit in the second mode without error correction, which conserves power and reduces latency. This is because reliability of the reception of the electrical transmission at electrical-to-optical converter 34 is increased as the short second trace 40 has lower loss and dissipative effects than a longer trace for full electrical transmission.

System 20 includes driver circuits 24 and 26 that provide first output signals for electrical signaling and second output signals for optical signaling. Each of the driver circuits 24 and 26 can be put into a first mode for providing the first output signals at a higher power and/or lower frequency. The first output signals are electrical signals transmitted over communication paths of limited length and having a limited number of connectors. Each of the driver circuits 24 and 26 can be put into a second mode for providing second output signals at a lower power and/or higher frequency. The second output signals are electrical signals transmitted over (races that are shorter than the traces and communication paths that receive the first output signals. The second output signals are received by an electrical-to-optical converter, such as electrical-to-optical converter 34 and the resulting optical signal is transmitted over an optical transmission path that can be substantially longer than the traces and communication paths that receive the first output signals. Using bimodal driver circuits 24 and 26, optical signaling can be used to conserve power over long distances. Less power is lost in dissipated heat and less power is lost in transit. Also, the driver circuits 24 and 26 do not consume as much power in the second mode or provide excess power to their respective pins.

Figure 3:
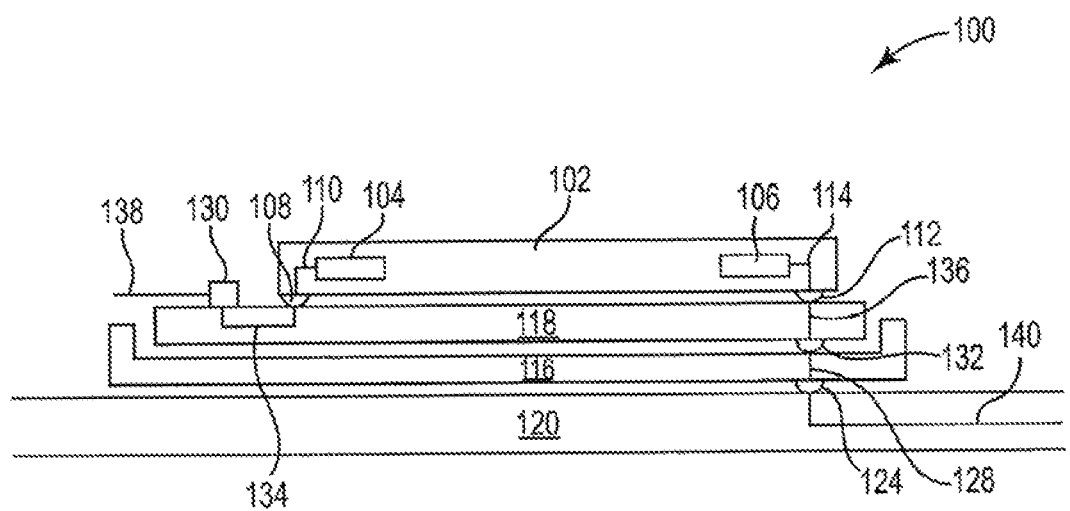
FIG. 3 is a diagram illustrating one embodiment of an integrated circuit system that couples an integrated circuit into a system via an interposer and a socket.

FIG. 3 is a diagram illustrating one embodiment of an integrated circuit system 100 that couples an integrated circuit 102 configured to provide first output signals for electrical signaling and second output signals for optical signaling into a system, such as a server. Integrated circuit 102 is similar to integrated circuit 22 (shown in FIG. 2). In one embodiment, integrated circuit 102 is a processor, such as a micro-processor.

Integrated circuit 102 includes a first driver circuit 104 and a second driver circuit 106, where each of the driver circuits 104 and 106 is configured to provide first output signals in a first mode for electrical signaling and second output signals in a second mode for optical signaling. Also, each of the driver circuits 104 and 106 is configured to provide the first output signals in the first mode at a lower frequency and/or higher power and the second output signals in the second mode at a higher frequency and/or lower power. Driver circuits 104 and 106 are similar to driver circuits 24 and 26 (shown in FIG. 2).

First driver circuit 104 is electrically coupled to a first pin 108 via first output path 110 and second driver circuit 106 is electrically coupled to a second pin 112 via second output path 114. In other embodiments, integrated circuit 102 includes any suitable number of driver circuits similar to driver circuits 104 and 106.

System 100 includes integrated circuit 102, socket 116, interposer 118, and circuit board 120. Socket 116 holds or retains interposer 118 and integrated circuit 102. Interposer 118 is a thin circuit board interposed or situated between integrated circuit 102 and socket 116. Interposer 118 is electrically coupled to integrated circuit 102 and electrically coupled to socket 116. Circuit board 120 is a system circuit board similar to circuit board 28 (shown in FIG. 2). In one embodiment, integrated circuit 102 is a packaged part that is inserted into interposer 118 and socket 116.

Interposer 118 includes electrical-to-optical converter 130 and interposer pin 132. First pin 108 is electrically coupled to interposer 118 and electrical-to-optical converter 130 via first interposer conductive path 134. Second pin 112 is electrically coupled to interposer 118 and interposer pin 132 via second interposer conductive path 136. Interposer 118 is optically coupled to another circuit (not shown) via optical transmission path 138. Socket 116 includes a socket pin 124 and interposer 118 is electrically coupled to socket 116 and socket pin 124 via interposer pin 132 and socket conductive path 128. Socket 116 is electrically coupled to circuit board 120 via socket pin 124 and circuit board trace 140. Electrical-to-optical converter 130 is similar to electrical-to-optical converter 34 (shown in FIG. 2). In one embodiment, optical transmission path 138 is substantially longer than 20 inches.

First driver circuit 104 is electrically coupled to electrical-to-optical converter 130 via first output path 110 to first pin 108 to first interposer conductive path 134 and electrical-to-optical converter 130. Second driver circuit 106 is electrically coupled to circuit board 120 and circuit board trace 140 via second output path 114 to second pin 112 to second interposer conductive path 136 to interposer pin 132 to socket conductive path 128 to socket pin 124 and circuit board trace 140. In one embodiment, the distance from first driver circuit 104 to electrical-to-optical converter 130 is less than 2 inches. In one embodiment, the distance from second driver circuit 106 to a component on circuit board trace 140 is up to 20 inches.

In operation, first driver circuit 104 is activated or put into the second mode to transmit second output signals for optical signaling. First driver circuit 104 transmits the second output signals to electrical-to-optical converter 130, where the second output signals can be at a higher frequency and/or lower power than the first output signals. Electrical-to-optical converter 130 converts the second output signals to optical signals and transmits the optical signals via optical transmission path 138. Second driver circuit 106 is activated or put into the first mode to transmit first output signals for electrical signaling. Second driver circuit 106 transmits the first output signals to components via circuit board trace 140, where the first output signals are at a lower frequency and/or higher power than the second output signals.

Figure 4:
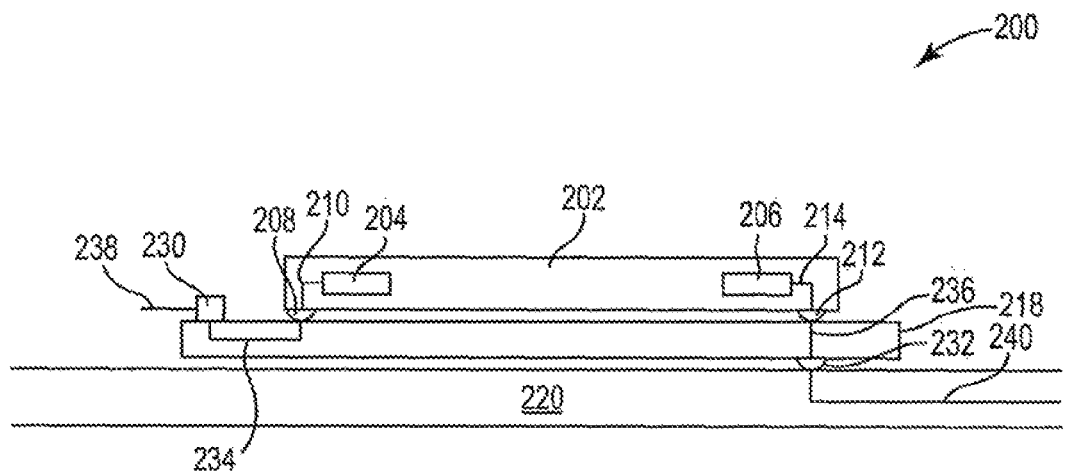
FIG. 4 is a diagram illustrating one embodiment of an integrated circuit system that couples an integrated circuit into a system without using a socket.

FIG. 4 is a diagram illustrating one embodiment of an integrated circuit system 200 that couples an integrated circuit 202 into a system, such as a server, without using a socket. Integrated circuit 202 is configured to provide first output signals for electrical signaling and second output signals for optical signaling. Integrated circuit 202 is similar to integrated circuit 22 (shown in FIG. 2). In one embodiment, integrated circuit 202 is a processor, such as a micro-processor.

Integrated circuit 202 includes a first driver circuit 204 and a second driver circuit 206, where each of the driver circuits 204 and 206 is configured to provide first output signals in a first mode for electrical signaling and second output signals in a second mode for optical signaling. Also, each of the driver circuits 204 and 206 is configured to provide the first output signals in the first mode at a lower frequency and/or higher power and the second output signals in the second mode at a higher frequency and/or lower power. Driver circuits 204 and 206 are similar to driver circuits 24 and 26 (shown in FIG. 2).

First driver circuit 204 is electrically coupled to a first pin 208 via first output path 210 and second driver circuit 206 is electrically coupled to a second pin 212 via second output path 214. In other embodiments, integrated circuit 202 includes any suitable number of driver circuits similar to driver circuits 204 and 206.

System 200 includes integrated circuit 202, interposer 218, and circuit board 220. Interposer 218 is a thin circuit board interposed or situated between integrated circuit 202 and circuit board 220. Interposer 218 is electrically coupled to integrated circuit 202 and electrically coupled to circuit board 220. Circuit board 220 is a system circuit board similar to circuit board 28 (shown in FIG. 2). In one embodiment, integrated circuit 202 is a packaged part.

Interposer 218 includes electrical-to-optical converter 230 and interposer pin 232. First pin 208 is electrically coupled to interposer 218 and electrical-to-optical converter 230 via first interposer conductive path 234. Second pin 212 is electrically coupled to interposer 218 and interposer pin 232 via second interposer conductive path 236. Interposer 218 is optically coupled to another circuit (not shown) via optical transmission path 238 and interposer 218 is electrically coupled to circuit board 220 via interposer pin 232 and circuit board trace 240. Electrical-to-optical converter 230 is similar to electrical-to-optical converter 34 (shown in FIG. 2). In one embodiment, optical transmission path 238 is substantially longer than 20 inches.

First driver circuit 204 is electrically coupled to electrical-to-optical converter 230 via first output path 210 to first pin 208 to first interposer conductive path 234 and electrical-to-optical converter 230. Second driver circuit 206 is electrically coupled to circuit board 220 and circuit board trace 240 via second output path 214 to second pin 212 to second interposer conductive path 236 to interposer pin 232 and circuit board trace 240. In one embodiment, the distance from first driver circuit 204 to electrical-to-optical converter 230 is less than 2 inches. In one embodiment, the distance from second driver circuit 206 to a component on circuit board trace 240 is up to 20 inches.

In operation, first driver circuit 204 is activated or put into the second mode to transmit second output signals for optical signaling. First driver circuit 204 transmits the second output signals to electrical-to-optical converter 230, where the second output signals can be at a higher frequency and/or lower power than the first output signals. Electrical-to-optical converter 230 converts the second output signals to optical signals and transmits the optical signals via optical transmission path 238. Second driver circuit 206 is activated or put into the first mode to transmit first output signals for electrical signaling. Second driver circuit 206 transmits the first output signals to components via circuit board trace 240, where the first output signals are at a lower frequency and/or higher power than the second output signals.

Figure 5:
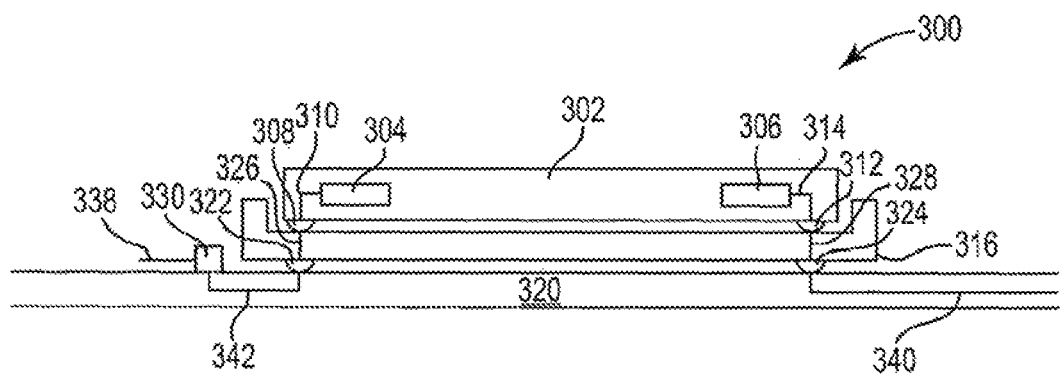
FIG. 5 is a diagram illustrating one embodiment of an integrated circuit system that couples an integrated circuit into a system without using an interposer.

FIG. 5 is a diagram illustrating one embodiment of an integrated circuit system 300 that couples an integrated circuit 302 into a system, such as a server, without using an interposer. Integrated circuit 302 is configured to provide first output signals for electrical signaling and second output signals for optical signaling. Integrated circuit 302 is similar to integrated circuit 22 (shown in FIG. 2). In one embodiment, integrated circuit 302 is a processor, such as a micro-processor.

Integrated circuit 302 includes a first driver circuit 304 and a second driver circuit 306, where each of the driver circuits 304 and 306 is configured to provide first output signals in a first mode for electrical signaling and second output signals in a second mode for optical signaling. Also, each of the driver circuits 304 and 306 is configured to provide the first output signals in the first mode at a lower frequency and/or higher power and the second output signals in the second mode at a higher frequency and/pr lower power. Driver circuits 304 and 306 are similar to driver circuits 24 and 26 (shown in FIG. 2).

First driver circuit 304 is electrically coupled to a first pin 308 via first output path 310 and second driver circuit 306 is electrically coupled to a second pin 312 via second output path 314. In other embodiments, integrated circuit 302 includes any suitable number of driver circuits similar to driver circuits 304 and 306.

System 300 includes integrated circuit 302, socket 316, and circuit board 320. Socket 316 holds or retains integrated circuit 302 and is electrically coupled to integrated circuit 302 and electrically coupled to circuit board 320. Circuit board 320 is a system circuit board similar to circuit board 28 (shown in FIG. 2). In one embodiment, integrated circuit 302 is a packaged part that is inserted in socket 316.

Socket 316 includes a first socket pin 322 and a second socket pin 324. First socket pin 322 is electrically coupled to first pin 308 of integrated circuit 302 via first socket conductive path 326. Second socket pin 324 is electrically coupled to second pin 312 of integrated circuit 302 via second socket conductive path 328.

Circuit board 320 includes electrical-to-optical converter 330. First socket pin 322 is electrically coupled to electrical-to-optical converter 330 via first circuit board trace 342. Second socket pin 324 is electrically coupled to circuit board 320 and second circuit board trace 340. Electrical-to-optical converter 330 transmits optical signals via optical transmission path 338. Electrical-to-optical converter 330 is similar to electrical-to-optical converter 34 (shown in FIG. 2). In one embodiment, optical transmission path 338 is substantially longer than 20 inches.

First driver circuit 304 is electrically coupled to electrical-to-optical converter 330 via first output path 310 to first pin 308 to first socket conductive path 326 to first socket pin 322 to first circuit board trace 342 and electrical-to-optical converter 330. Second driver circuit 306 is electrically coupled to circuit board 320 and circuit board trace 340 via second output path 314 to second pin 312 to second socket conductive path 328 to second socket pin 324 to second circuit board trace 340. In one embodiment, the distance from first driver circuit 304 to electrical-to-optical converter 330 is less than 2 inches. In one embodiment, the distance from second driver circuit 306 to a component on circuit board trace 340 is up to 20 inches.

In operation, first driver circuit 304 is activated or put into the second mode to transmit second output signals for optical signaling. First driver circuit 304 transmits the second output signals to electrical-to-optical converter 330, where the second output signals can be at a higher frequency and/or lower power than the first output signals. Electrical-to-optical converter 330 converts the second output signals to optical signals and transmits the optical signals via optical transmission path 338. Second driver circuit 306 is activated or put into the first mode to transmit first output signals for electrical signaling. Second driver circuit 306 transmits the first output signals to components via circuit board trace 340, where the first output signals are at a lower frequency and/or higher power than the second output signals.

Figure 6:
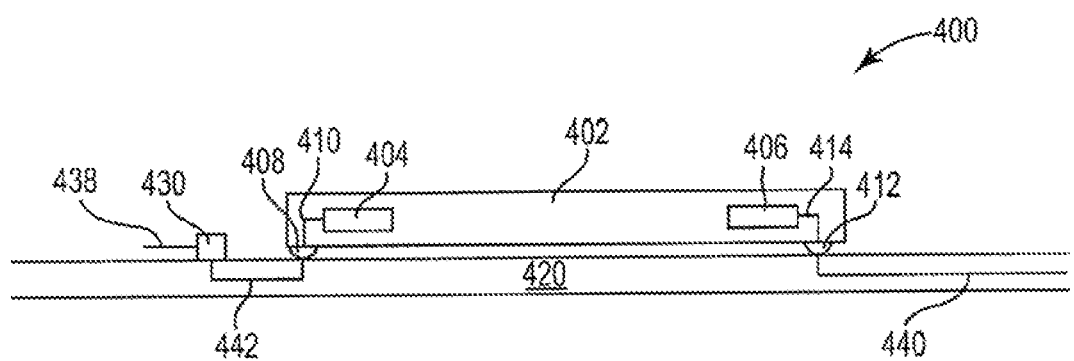
FIG. 6 is a diagram illustrating one embodiment of an integrated circuit system that couples an integrated circuit into a system without using a socket or an interposer.

FIG. 6 is a diagram illustrating one embodiment of an integrated circuit system 400 that couples an integrated circuit 402 into a system, such as a server, without using a socket or an interposer. Integrated circuit 402 is configured to provide first output signals for electrical signaling and second output signals for optical signaling. Integrated circuit 402 is similar to integrated circuit 22 (shown in FIG. 2). In one embodiment, integrated circuit 402 is a processor, such as a micro-processor.

Integrated circuit 402 includes a first driver circuit 404 and a second driver circuit 406, where each of the driver circuits 404 and 406 is configured to provide first output signals in a first mode for electrical signaling and second output signals in a second mode for optical signaling. Also, each of the driver circuits 404 and 406 is configured to provide the first output signals in the first mode at a lower frequency and/or higher power and the second output signals in the second mode at a higher frequency and/or lower power. Driver circuits 404 and 406 are similar to driver circuits 24 and 26 (shown in FIG. 2).

First driver circuit 404 is electrically coupled to a first pin 408 via first output path 410 and second driver circuit 406 is electrically coupled to a second pin 412 via second output path 414. In other embodiments, integrated circuit 402 includes any suitable number of driver circuits similar to driver circuits 404 and 406.

System 400 includes integrated circuit 402 and circuit board 420. Integrated circuit 402 is electrically coupled to circuit board 420. Circuit board 420 is a system circuit board similar to circuit board 28 (shown in FIG. 2). In one embodiment, integrated circuit 402 is a packaged part.

Circuit board 420 includes electrical-to-optical converter 430. First pin 408 is electrically coupled to electrical-td-optical converter 430 via first circuit board trace 442. Second pin 412 is electrically coupled to circuit board 420 and second circuit board trace 440. Electrical-to-optical converter 430 transmits optical signals via optical transmission path 438. Electrical-to-optical converter 430 is similar to electrical-to-optical converter 34 (shown in FIG. 2). In one embodiment, optical transmission path 438 is substantially longer than 20 inches.

First driver circuit 404 is electrically coupled to electrical-to-optical converter 430 via first output path 410 to first pin 408 to first circuit board trace 442 and electrical-to-optical converter 430. Second driver circuit 406 is electrically coupled to circuit board 420 and circuit board trace 440 via second output path 414 to second pin 412 to second circuit board trace 440. In one embodiment, the distance from first driver circuit 404 to electrical-to-optical converter 430 is less than 2 inches. In one embodiment, the distance from second driver circuit 406 to a component on circuit board trace 440 is up to 20 inches.

In operation, first driver circuit 404 is activated or put into the second mode to transmit second output signals for optical signaling. First driver circuit 404 transmits the second output signals to electrical-to-optical converter 430, where the second output signals can be at a higher frequency and/or lower power than the first output signals. Electrical-to-optical converter 430 converts the second output signals to optical signals and transmits the optical signals via optical transmission path 438. Second driver circuit 406 is activated or put into the first mode to transmit first output signals for electrical signaling. Second driver circuit 406 transmits the first output signals to components via circuit board trace 440, where the first output signals are at a lower frequency and/or higher power than the second output signals.

Figure 7:
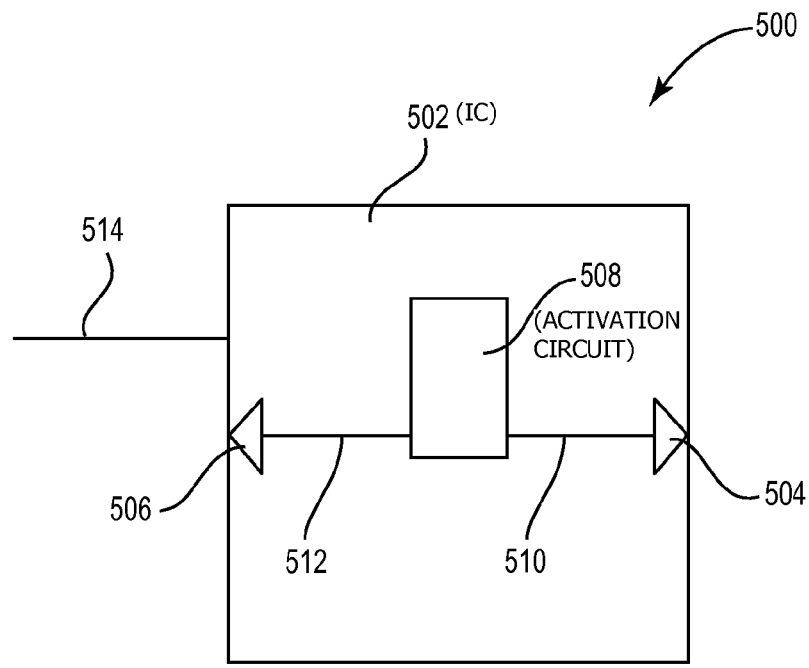
FIG. 7 is a diagram illustrating one embodiment of an integrated circuit system that includes an integrated circuit and an activation circuit.

FIG. 7 is a diagram illustrating one embodiment of an integrated circuit system 500 that includes an integrated circuit 502 and an activation circuit 508. Integrated circuit 502 is configured to provide first output signals for electrical signaling and second output signals for optical signaling. Integrated circuit 502 is similar to integrated circuit 22 (shown in FIG. 2). In one embodiment, integrated circuit 502 is a processor, such as a micro-processor.

Integrated circuit 502 includes a first driver circuit 504 and a second driver circuit 506, where each of the driver circuits 504 and 506 is configured to provide first output signals in a first mode for electrical signaling and second output signals in a second mode for optical signaling. Also, each of the driver circuits 504 and 506 is configured to provide the first output signals in the first mode at a lower frequency and/or higher power and the second output signals in the second mode at a higher frequency and/or lower power. Driver circuits 504 and 506 are similar to driver circuits 24 and 26 (shown in FIG. 2).

Activation circuit 508 is programmed to put first driver circuit 504 into either the first mode or the second mode and to put second driver circuit 506 into either the first mode or the second mode. Activation circuit 508 is electrically coupled to first driver circuit 504 via first activation path 510 and to second driver circuit 506 via second activation path 512. In one embodiment, activation circuit 508 is a programmable register.

In operation, integrated circuit 502 receives activation data via data path 514 to program activation circuit 508. First driver circuit 504 is put into the first mode or the second mode via activation circuit 508 and first activation path 510. Second driver circuit 506 is put into the first mode or the second mode via activation circuit 508 and second activation path 512.

Figure 8:
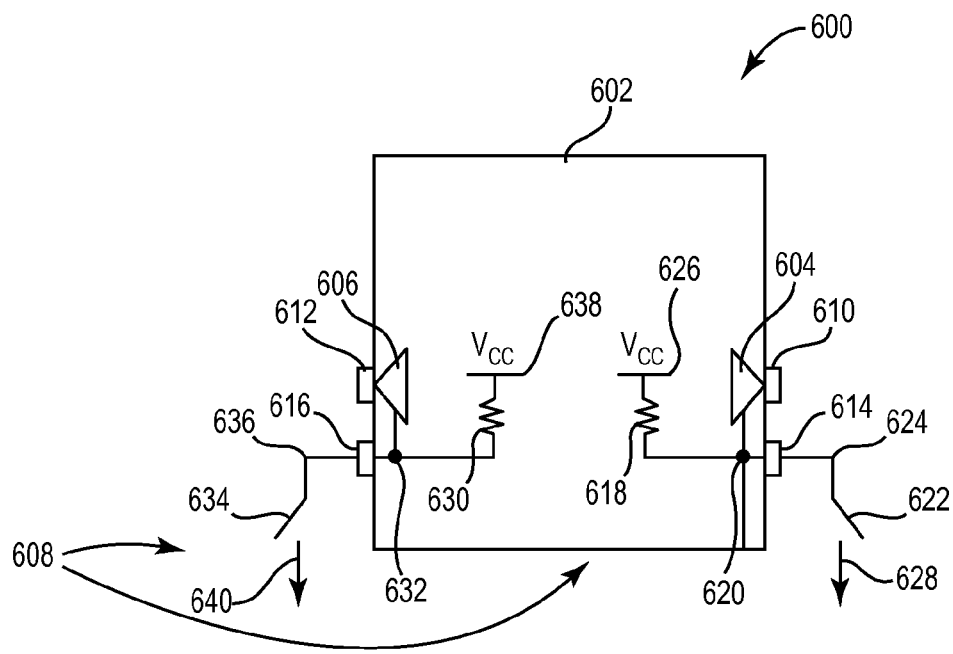
FIG. 8 is a diagram illustrating one embodiment of an integrated circuit system that includes ah integrated circuit and an activation circuit that uses pins.

FIG. 8 is a diagram illustrating one embodiment of an integrated circuit system 600 that includes an integrated circuit 602 and an activation circuit 608. Integrated circuit 602 is configured to provide first output signals for electrical signaling and second output signals for optical signaling. Integrated circuit 602 is similar to integrated circuit 22 (shown in FIG. 2). In one embodiment integrated circuit 602 is a processor, such as a micro-processor.

Integrated circuit 602 includes a first driver circuit 604 and a second driver circuit 606, where each of the driver circuits 604 and 606 is configured to provide first output signals in a first mode for electrical signaling and second output signals in a second mode for optical signaling. Also, each of the driver circuits 604 and 606 is configured to provide the first output signals in the first mode at a lower frequency and/or higher power and the second output signals in the second mode at a higher frequency and/pr lower power. Driver circuits 604 and 606 are similar to driver circuits 24 and 26 (shown in FIG. 2).

Integrated circuit 602 includes pins 610, 612, 614, and 616. Pin 610 is electrically coupled to the output of first driver circuit 604 and pin 612 is electrically coupled to the output of second driver circuit 606. Pin 614 is electrically coupled first driver circuit 604 and first internal pull-up resistor 618 via first internal path 620. Pin 614 is electrically coupled to a first switch 622 via first switch path 624. The other side of first internal pull-up resistor 618 is electrically coupled to power at 626 and the other side of first switch 622 is electrically coupled to a reference, such as ground, at 628. Pin 616 is electrically coupled to second driver circuit 606 and a second internal pull-up resistor 630 via second internal path 632. Pin 616 is electrically coupled to second switch 634 via second switch path 636. The other side of second internal pull-up resistor 630 is electrically coupled to power at 638 and the other side of second switch 634 is electrically coupled to a reference, such as ground, at 640.

First switch 622 is closed to put first driver circuit 604 into one of the first mode or the second mode and first switch 622 is left open to put first driver circuit 604 into the other one of the first mode or the second mode. Second switch 634 is closed to put second driver circuit 606 into one of the first mode or the second mode and second switch 634 is left open to put second driver circuit 606 into the other one of the first mode and the second mode. First switch 622 is closed to pull pin 614 low and first switch 622 is left open to pull first pin 614 high via first internal pull-up resistor 618. Second switch 634 is closed to pull pin 616 low and second switch 634 is left open to pull second pin 616 high via second internal pull-up resistor 630. In one embodiment, one pin is used to set all driver circuits to the first mode, or the second mode. In one embodiment, any suitable number of pins can be used to set driver circuits to the first mode or the second mode.

In operation, first switch 622 is closed or left open to put first driver circuit 604 into one of the first mode or the second mode, and second switch 634 is closed or left open to put second driver circuit 606 into one of the first mode or the second mode.

Figure 9:
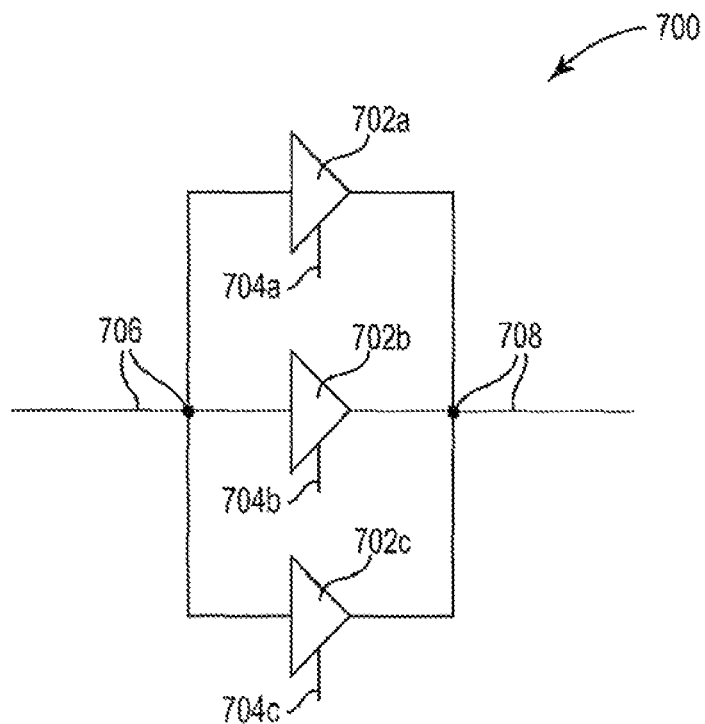
FIG. 9 is a diagram illustrating one embodiment of a driver circuit that provides first output signals in a first mode for electrical signaling and second output signals in a second mode for optical signaling.

FIG. 9 is a diagram illustrating one embodiment of a driver circuit 700 that provides first output signals in a first mode for electrical signaling and second output signals in a second mode for optical signaling. Driver circuit 700 provides the first output signals in the first mode at a lower frequency and/or higher power and the second output signals in the second mode at a higher frequency and/or lower power. Driver circuit 700 is similar to driver circuit 24 or driver circuit 26 (shown in FIG. 2).

Driver circuit 700 includes a first driver 702a, a second driver 702b, and a third driver 702c. Each of the drivers 702a-702c includes an enable input. Driver 702a includes enable input 704a, driver 702b includes enable input 704b, and driver 702c includes enable input 704c. An input line 706 is electrically coupled to an input of each of the drivers 702a-702c, and an output line 708 is electrically coupled to an output of each of the drivers 702a-702c.

In operation, to put driver circuit 700 into the first mode for electrical signaling, all drivers 702a-702b are enabled via enable inputs 704a-704c. In the first mode, driver circuit 700 provides the first output signals at a lower frequency and/or higher power. To put driver circuit 700 into the second mode for optical signaling, driver 702a is enabled via enable input 704a, and the other two drivers 702b and 702c are disabled via enable inputs 704b and 704c. In the second mode, driver circuit 700 provides the second output signals at a higher frequency and/or lower power. In one embodiment, two of the three drivers 702a-702c are enabled for a third mode of operation. In other embodiments, two of the three drivers 702a-702c are enabled for the first mode or the second mode.

Figure 10:
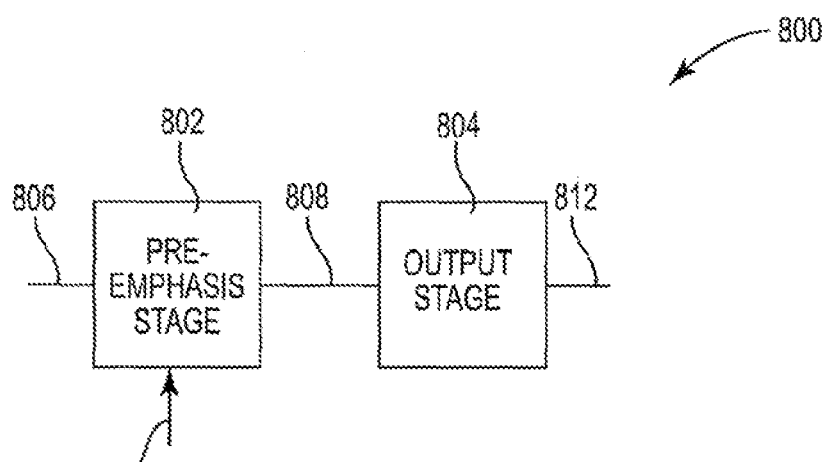
FIG. 10 is a diagram illustrating one embodiment of a driver circuit that includes a pre-emphasis stage and an output stage.

FIG. 10 is a diagram illustrating one embodiment of a driver circuit 800 that includes a pre-emphasis stage 802 and an output stage 804. Driver circuit 800 provides first output signals in a first mode for electrical signaling and second output signals in a second mode for optical signaling. Driver circuit 800 provides the first output signals in the first mode at a lower frequency and/or higher power and the second output signals in the second mode at a higher frequency and/or lower power. Driver circuit 800 is similar to driver circuit 24 or driver circuit 26 (shown in FIG. 2).

Pre-emphasis stage 802 receives signals at 806 and is electrically coupled to output stage 804 via driver path 808. Pre-emphasis stage 802 receives a mode signal at 810. Output stage 804 provides the first and second output signals at 812.

In operation, a first mode signal at 810 is provided to pre-emphasis stage 802 to put driver circuit 800 into the first mode for electrical signaling. In the first mode, driver circuit 800 provides the first output signals at a lower frequency and/or higher power. A second mode signal at 810 is provided to pre-emphasis stage 802 to put driver circuit 800 into the second mode for optical signaling. In the second mode, driver circuit 800 provides the second output signals at a higher frequency and/or lower power.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system, comprising:
    a first driver circuit and a second driver circuit, each of the first and second driver circuits configured to selectively provide first electrical output signals in a first mode with lower frequency and higher power for electrical signaling, and second electrical output signals in a second mode with higher frequency and lower power for optical signaling;
    an electrical-to-optical converter configured to receive the second electrical output signals from the first driver circuit selectively set to the second mode, and to convert the second electrical output signals from the first driver circuit to optical signals;
    an electrical component configured to receive the first electrical output signals from the second driver circuit selectively set to the first mode; and
    an integrated circuit to:
        in response to determining that the first driver circuit is in the second mode, provide data without error correction to the first driver circuit in the second mode, and
        in response to determining that the second driver circuit is in the first mode, provide data with the error correction to the second driver circuit in the first mode.

2. The system of claim 1, wherein the integrated circuit includes the first and second driver circuits, the system comprising:
    a circuit board; and
    an interposer coupled between the integrated circuit and the circuit board, wherein the electrical-to-optical converter is mounted on the interposer and the interposer is configured to route the second output signals from the first driver circuit to the electrical-to-optical converter.

3. The system of claim 1, wherein the integrated circuit includes the first and second driver circuits, the system comprising:
    a circuit board, wherein the electrical-to-optical converter is mounted on the circuit board and the circuit board is configured to route the second output signals from the first driver circuit to the electrical-to-optical converter.

4. A method comprising:
    selectively setting a first driver circuit into one of a first mode and a second mode, and selectively setting a second driver circuit into one of the first mode and the second mode, wherein in the first mode each of the first and second driver circuits outputs first electrical output signals with a lower frequency and higher power for electrical signaling, and wherein in the second mode each of the first and second driver circuits outputs second electrical output signals with a higher frequency and lower power for optical signaling;
    routing the second electrical output signals from the first driver circuit selectively set to the second mode to an electrical-to-optical converter;
    routing the first electrical output signals from the second driver circuit selectively set to the first mode to an electrical component; and
    in response to determining that the first driver circuit is in the second mode, providing, by an integrated circuit, data without error correction to the first driver circuit in the second mode; and
    in response to determining that the second driver circuit is in the first mode, providing, by the integrated circuit, data with the error correction to the second driver circuit in the first mode.

5. The method of claim 4, wherein selectively setting the first driver circuit into one of the first and second modes comprises:
    programming a register to put the first driver circuit into the second mode.

6. The method of claim 4, wherein selectively setting the first driver circuit into one of the first and second modes comprises:
    pulling a pin to one of high and low to put the first driver circuit into the second mode.

7. The system of claim 1, further comprising a circuit board including a conductive trace, wherein the electrical component is configured to receive the first electrical output signals from the second driver circuit over the conductive trace of the circuit board.

8. The system of claim 1, wherein the first driver circuit includes a plurality of drivers, and wherein the first driver circuit is configured to be set to the second mode by activating only a first number of the plurality of drivers to provide the second electrical output signals with higher frequency and lower power, and the first driver circuit is configured to be set to the first mode by activating a second, larger number of the plurality of drivers to provide the first electrical output signals with lower frequency and higher power.

9. The system of claim 8, wherein the second driver circuit includes a plurality of drivers, and wherein the second driver circuit is configured to be set to the second mode by activating only the first number of the plurality of drivers of the second driver circuit to provide the second electrical output signals with higher frequency and lower power, and the second driver circuit is configured to be set to the first mode by activating the second number of the plurality of drivers of the second driver circuit to provide the first electrical output signals with lower frequency and higher power.

10. The method of claim 4, wherein routing the first electrical output signals from the second driver circuit to the electrical component comprises routing the first electrical output signals from the second driver circuit over a conductive trace of a circuit board to the electrical component.

11. The method of claim 4, wherein each of the first and second driver circuits includes a plurality of drivers, the method further comprising:
    activating only a first number of the plurality of drivers of the first driver circuit to set the first driver circuit to the second mode to output the second electrical output signals with a higher frequency and lower power; and
    activating a second, larger number of the plurality of drivers of the second driver circuit to set the second driver circuit to the first mode to output the first electrical output signals with a lower frequency and higher power.

12. The method of claim 4, further comprising converting, by the electrical-to-optical converter, the second electrical signals from the first driver circuit to optical signals.

13. The method of claim 4, further comprising programming an activation circuit to set the first driver circuit to the second mode, and to set the second driver circuit to the first mode.

14. A system, comprising:
a first driver circuit and a second driver circuit, each of the first and second driver circuits configured to selectively provide first electrical output signals in a first mode with a lower frequency and higher power for electrical signaling, and second electrical output signals in a second mode with a higher frequency and lower power for optical signaling;
an electrical-to-optical converter configured to receive the second electrical output signals from the first driver circuit selectively set to the second mode, and to convert the second electrical output signals from the first driver circuit to optical signals;
an electrical component configured to receive the first electrical output signals from the second driver circuit selectively set to the first mode; and
an integrated circuit to:
in response to determining that the first driver circuit is in the second mode, provide data without error correction to the first driver circuit in the second mode, and
in response to determining that the second driver circuit is in the first mode, provide data with the error correction to the second driver circuit in the first mode.

15. The system of claim 14, wherein the first driver circuit includes a plurality of drivers, and wherein the first driver circuit is configured to be set to the second mode by activating only a first number of the plurality of drivers to output the second electrical output signals with a higher frequency and lower power, and the first driver circuit is configured to be set to the first mode by activating a second, larger number of the plurality of drivers to output the first electrical output signals with a lower frequency and higher power.

16. The system of claim 15, wherein the second driver circuit includes a plurality of drivers, and wherein the second driver circuit is configured to be set to the second mode by activating only the first number of the plurality of drivers of the second driver circuit to output the second electrical output signals with a higher frequency and lower power, and the second driver circuit is configured to be set to the first mode by activating the second number of the plurality of drivers of the second driver circuit to output the first electrical output signals with a lower frequency and higher power.

17. The system of claim 14, further comprising a programmable register to receive program data to set the first driver circuit to the second mode, and to set the second driver circuit to the first mode.

* * * * *